US011513717B2

(12) United States Patent
Friedman et al.

(10) Patent No.: US 11,513,717 B2
(45) Date of Patent: Nov. 29, 2022

(54) ONLINE DATA REHYDRATION

(71) Applicant: VMware, Inc., Palo Alto, CA (US)

(72) Inventors: Dave Friedman, Palo Alto, CA (US);
Derek Uluski, Palo Alto, CA (US);
Michael Zucca, Somerville, MA (US)

(73) Assignee: VMware, Inc., Palo Alto, CA (US)

( * ) Notice: Subject to any disclaimer, the term of this patent is extended or adjusted under 35 U.S.C. 154(b) by 35 days.

(21) Appl. No.: 17/155,912

(22) Filed: Jan. 22, 2021

(65) Prior Publication Data

US 2022/0236878 A1 Jul. 28, 2022

(51) Int. Cl.
*G06F 12/00* (2006.01)
*G06F 3/06* (2006.01)
*G06F 9/455* (2018.01)

(52) U.S. Cl.
CPC .............. *G06F 3/065* (2013.01); *G06F 3/067* (2013.01); *G06F 3/0619* (2013.01); *G06F 3/0664* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| 8,438,420 | B1 * | 5/2013 | Dutch | G06F 11/1469 |
| | | | | 714/2 |
| 9,760,448 | B1 * | 9/2017 | Per | G06F 3/0619 |
| 2012/0324280 | A1 * | 12/2012 | Wang | G06F 11/1417 |
| | | | | 714/15 |

OTHER PUBLICATIONS helpcenter.veeam.com [online], "Instant VM Recovery," Apr. 5, 2021, retrieved on Aug. 23, 2021, retrieved from URL <https://helpcenter.veeam.com/archive/backup/100/vsphere/instant_recovery.html>, 2 pages.

* cited by examiner

*Primary Examiner* — Daniel D Tsui
(74) *Attorney, Agent, or Firm* — Fish & Richardson P.C.

(57) ABSTRACT

Methods, systems, and apparatus, including computer programs encoded on computer storage media, for online rehydration. One of the methods includes intercepting a request issued by a virtual computing instance to a primary storage system, wherein the request identifies first data stored in the primary storage system; determining whether the first data has been rehydrated by a rehydration system; and in response to determining that at least a first portion of the first data has not been rehydrated by the rehydration system: submitting, to the rehydration system, a rehydration request that identifies the first portion of the first data that has not been rehydrated; obtaining, from the rehydration system, a response that includes a copy of the first portion of the first data, wherein the rehydration system has obtained the copy from a backup storage system; and responding to the request using the copy of the first portion of the first data.

18 Claims, 6 Drawing Sheets

ONLINE DATA REHYDRATION

BACKGROUND

This specification generally relates to data recovery.

In some conventional storage systems, when recovering from a failure, the storage system must fully rehydrate every piece of data using a backup stored by an external system, e.g., a full backup that includes a set of disks, files, and/or virtual machines. In these conventional systems, until the storage system is fully rehydrated, the storage system cannot support workloads, e.g., workloads executed by virtual machines that require the data stored in the storage system. Therefore, the workloads might experience an interruption in availability during the recover process, which can be lengthy. For example, recovering an entire disk or virtual machine can take a significant amount of time, e.g., multiple hours or days, and consume significant computational and/or network resources.

SUMMARY

This specification generally describes a system that performs online data rehydration.

In this specification, "rehydrating" data stored in a first storage system refers to a process in which a system recovers a copy of the data from a second storage system and places the copy in the first storage system. In this specification, a rehydration procedure for data in a storage system is "online" if a system, e.g., one or more virtual machines and/or one or more containers, are actively accessing the storage system during the rehydration procedure.

For example, the system can include rehydration system that is configured to rehydrate data stored in a primary storage system following a failure, and a request manager that is configured to intercept requests submitted by a virtual machine to the primary storage system. The virtual machine can execute workloads that rely on the primary storage system while the rehydration system is in the process of rehydrating the primary storage system.

The request manager can determine whether or not the data in the primary storage system that is referenced in the request has already been rehydrated. If the data has been rehydrated, then the request manager can forward the request to the primary storage system, as the primary storage system can successfully respond to the request using the rehydrated data. If the data has not been rehydrated, then the request manager can coordinate with the rehydration system to prioritize rehydrating the data before responding to the request.

As a particular example, if the request is a read request, then the request manager can submit a rehydration request to the rehydration system to obtain the requested data. After receiving the request data from the rehydration system, the request manager can both i) provide the requested data to the virtual machine in response to the read request and ii) store the requested data in the primary storage system, so that the data is available for future requests. The request manager can further update tracking data that tracks the rehydration status of each piece of data stored in the primary storage system to reflect that the requested data has now been rehydrated.

As another particular example, if the request is a write request that includes a request to overwrite first data stored in the primary storage system, then the request manager can submit a rehydration request to the rehydration system to obtain the first data. After receiving the first data from the rehydration system, the request manager can overwrite the first data according to the write request, and store the overwritten data in the primary storage system. For example, if the write request specifies that the first data is to be wholly replaced with new data, then the request manager can discard the first data and write the new data to the primary storage system. As another example, if the write request specifies that only a portion of the first data is to be modified, then the request manager can modify the portion of the first data according to the write request and then write the modified first data to the primary storage system. The request manager can further update the tracking data to reflect that the first data has been rehydrated and/or that the first data has been overwritten.

Particular embodiments of the subject matter described in this specification can be implemented so as to realize one or more of the following advantages.

After a failure of a cloud computation platform, e.g., a failure that causes a storage system of the platform to be offline for a period of time, a key metric for responding to the failure is the duration of time before the services of the cloud computing platform are back online. Using techniques described in this specification, a system can reduce the amount of time that the resources of a cloud computing platform are unavailable by executing an online rehydration procedure that allows workloads of the platform to run while the storage system is still being rehydrated. That is, the platform does not need to wait until all the data in the storage system has been fully recovered to being executing the workloads; instead, workloads can begin executing again almost immediately after the failure, or after a minimum threshold of the data in the primary storage system has been rehydrated. The reduced time before workloads can begin executing again can be particularly important when running critical workloads for which a prolonged interruption would have severely negative consequences.

In some existing systems, while a storage system is being rehydrated, workloads leverage a "snapshot" of the storage system, typically located in a different location than the storage system. However, there is typically a performance penalty of writing to the snapshot instead of writing directly to the storage system. Furthermore, after the storage system has been rehydrated, typically the system executes a consolidation procedure to align the storage system with the changes that were made to the snapshot. This consolidation procedure can be a computationally expensive and bandwidth-intensive operation. Using techniques described in this specification, workloads can read and write to the storage system itself, in-place, while the storage system is being rehydrated, and thus can avoid the costs of using a snapshot and executing a consolidation procedure.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for rehydrating data stored in a storage system while the storage system is being actively used.

Figure 1:
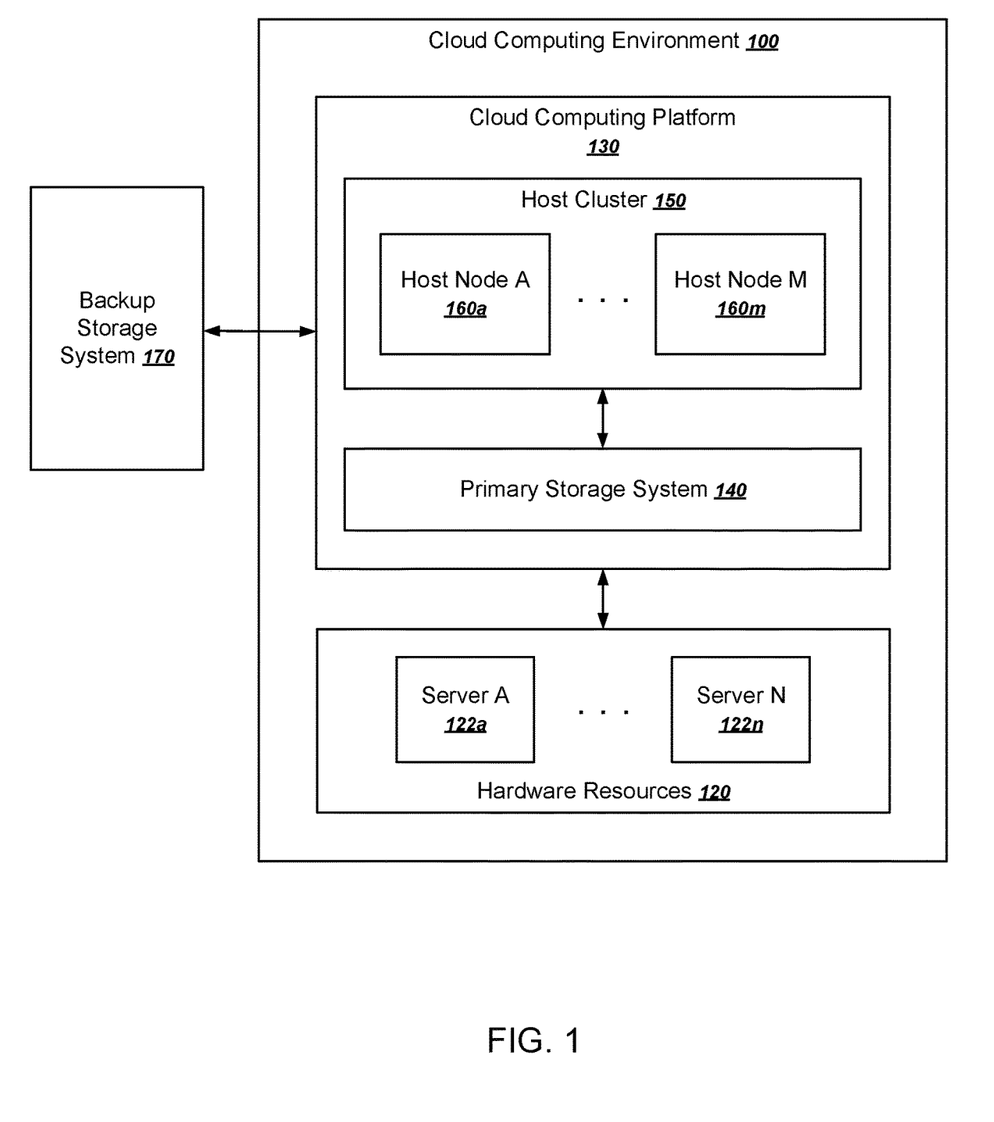
FIG. 1 is a block diagram of an example cloud computing environment.

FIG. 1 is a block diagram of an example cloud computing environment 100. The cloud computing environment 100 includes a cloud computing platform 130 and hardware resources 120.

The cloud computing platform 130 includes a primary storage system 140 and a host cluster 150. The host cluster 150 includes M nodes 160a-m, which are each virtual execution environments that are each configured to execute one or more workloads. For example, one or more of the host nodes 160a-m can implement an application, e.g., a web application, that has been launched by a user of the cloud computing platform 130.

The primary storage system 140 is configured to store data associated with the nodes 160a-m, e.g., data required for the workloads executing on the host cluster 150. The primary storage system 140 can be communicatively connected to one or more of the nodes 160a-m, such that the primary storage system 140 receives and executes requests from the workloads to read and write data.

The hardware resources 120 include N servers 122a-n, where N≥1. The hardware resources 120 are typically hosted within a data center, which can be a distributed computing system having hundreds or thousands of computers in one or more locations. The hardware resources 120 are configured to implement the cloud computing platform 130. For example, the hardware resources 120 can provide compute resources for executing workloads on the host cluster 150, and/or storage resources for maintaining the storage system 140. As a particular example, in some implementations, each host node 160a-m is hosted on a respective different server 122a-n.

When the primary storage system 140 experiences a failure, the cloud computing platform 130 can execute a rehydration procedure to recover the data stored in the primary storage system 140. The failure can be any event that causes the data stored in the primary storage system 140 to be lost, corrupted, or desynchronized.

For example, the respective hardware resources 120 that implement the primary storage system 140 may have been offline for a period of time, e.g., as a result of a natural disaster, hardware failure, or operator error.

As a particular example, when the primary storage system 140 comes back online, some or all of the data that was stored by the primary storage system 140 at the time of the failure is still accessible by the primary storage system 140. However, if the workloads of the host cluster 150 continued to run while the primary storage system 140 was unavailable (e.g., if the workloads continued to run using a backup storage system), then the data stored by the primary storage system 140 may be stale or incorrect because of changes to the data that occurred while the primary storage system 140 was offline. Therefore, the cloud computing platform 130 can rehydrate the primary storage system 140 with the correct and up-to-date version of the data.

As another particular example, when the primary storage system 140 comes back online, some or all of the data that was stored by the primary storage system 140 has been lost completely, and therefore the cloud computing platform can rehydrate the primary storage system 140 to recover the data. For example, the cloud computing environment 100 may have migrated the primary storage system 140 to different hardware resources 120 in response to a failure in the original hardware resources that original hosted the primary storage system 140. In some implementations, if all of the data that was stored by the primary storage system 140 has been lost completely, then the cloud computing platform 130 can rehydrate a new primary storage system that replaces the existing primary storage system 140. That is, although this specification may refer to rehydrating the same primary storage system that failed, generally the data that had been stored in the failed primary storage system can be rehydrated in a new location, e.g., in new storage hardware or in a new address space of the same storage hardware. For example, if the hardware resources 120 were taken offline by a natural disaster, e.g., a flood or an earthquake, then the hardware resources 120 may still be unavailable during the rehydration procedure, and thus the data can be rehydrated into different hardware resources.

As another example, some or all of the data that is stored by the primary storage system 140 may have been wiped accidentally, e.g., because of operator error or a bug in a computer program running on the cloud computing platform 130. As another example, a user or a system of the cloud computing environment 100 may have discovered an issue with some or all of the data that is stored by the primary storage system 140; that is, the failure event that caused the issue may be unknown. As another example, the cloud computing environment 100 may have been a victim of ransomware or other malware.

In some cases, one or more of the host nodes 160a-m may also have experienced a failure. For example, a virtual machine executing on a respective node 160a-m that uses the primary storage system 140 may have crashed. In these cases, the cloud computing platform 130 can relaunch the virtual machine before beginning an online rehydration procedure for the primary storage system 140, as described below.

In some implementations, the cloud computing platform 130 can rehydrate a portion of the data stored in the primary storage system 140 that is required for the virtual machine to operate, i.e., execute an offline rehydration procedure for the portion of the data. After the portion of the data has been rehydrated and the virtual machine relaunched, the cloud computing platform can begin the online rehydration procedure, where the virtual machine is running and submitting requests for data in the primary storage system 140 while the cloud computing platform 130 is rehydrating the data in the primary storage system 140. This process is discussed in more detail below with reference to FIG. 2A. In some other implementations, the cloud computing platform 130 can relaunch the virtual machine without requiring the rehydration of any data stored in the primary storage system 140.

To rehydrate the primary storage system 140, the cloud computing platform 130 can leverage a backup storage system 170. The backup storage system 170 is configured to be a backup for the primary storage system 140, i.e., to store a copy of the data that is stored by the primary storage system 140. In some implementations, the cloud computing platform 130 backs up the local storage system 140 (i.e., sends a copy of the data stored by the local storage system 140 to the backup storage system 170) at regular intervals, e.g., every week, day, or hour. In some other implementations, the cloud computing platform 130 only backs up the local storage system 140 when the platform 130 receives a backup command, e.g., from a user device or an external system.

In the example depicted in FIG. 1, the backup storage system 170 is remote, i.e., external to the cloud computing environment 100. In some other implementations, the backup storage system 170 is local, i.e., hosted on the cloud computing environment 100.

In some implementations, the backup storage system 170 can be used by the host cluster 150 to store data for the workloads of the cluster 150 while the primary storage system 140 is unavailable. For example, as described above, the workloads can leverage the backup storage system 170 to continue running while the primary storage system 140 is offline, e.g., as a result of a hardware failure.

In some implementations, the rehydration procedure executed by the cloud computing platform 130 is an online rehydration procedure; that is, the host nodes 160a-m can continue to execute their workloads during the rehydration procedure. For example, one or more user-deployed web applications running on respective nodes 160a-m of the cluster 150 can continue to execute during the rehydration procedure. This process is discussed in more detail below.

Figure 2A:
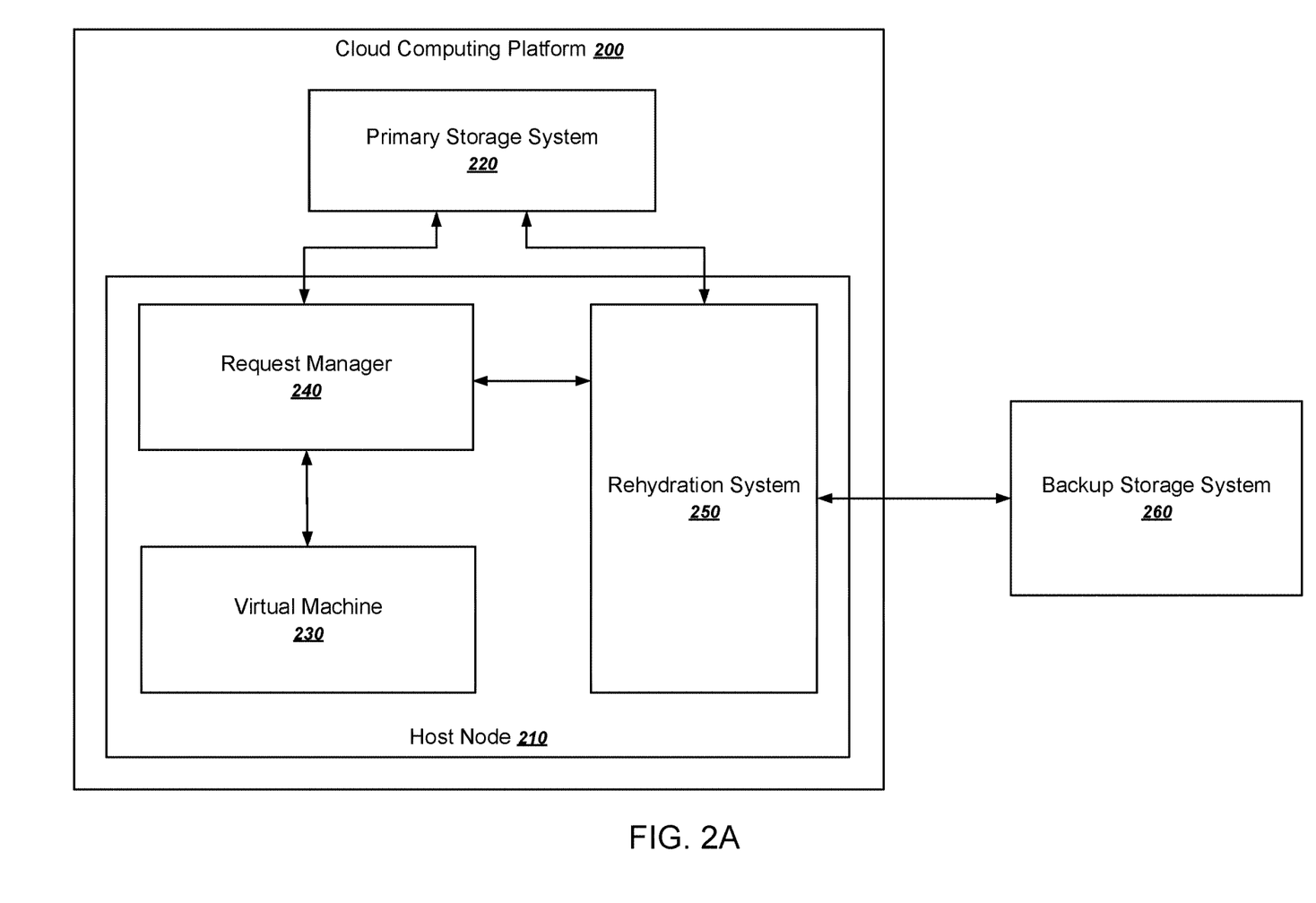
FIGS. 2A-2C are block diagrams of an example cloud computing platform that is executing a rehydration procedure.

FIG. 2A is a block diagram of an example cloud computing platform 200 that is executing a rehydration procedure. The cloud computing platform 200 is an example of a system implemented as computer programs on one or more computers in one or more locations, in which the systems, components, and techniques described below can be implemented.

The cloud computing platform 200 includes a host node 210 and a primary storage system 220. As described above with reference to FIG. 1, the host node 210, which may be one of many nodes of the cloud computing platform, is a virtual execution environment that is configured to execute one or more workloads. The primary storage system 220 is configured to store data for the one or more workloads executed by the host node 210.

The host node 210 includes a virtual machine 230, a request manager 240, and a rehydration system 250. The virtual machine 230 is configured to execute one or more workloads of the host node 210. For example, the virtual machine 230 can implement a web application that has been launched by a user of the cloud computing platform 200.

The rehydration system 250 is configured to execute an online rehydration procedure for the cloud computing platform 200 to recover data stored in the primary storage system 220. In particular, the rehydration system 250 can access a backup storage system 260 that stores a copy of the data that is stored by the primary storage system 220 (or that had been stored by the primary storage system 220 before a failure of the primary storage system 220), as described above with reference to FIG. 1. In some implementations, the rehydration system 250 rehydrates a new primary storage system 220 that is different from the failed primary storage system that originally stored the data, as described above with reference to FIG. 1.

The rehydration system 250 can rehydrate the primary storage system 220 by submitting a sequence of read requests to the backup storage system 260, where each read request is a request for the backup storage system 260 to provide a respective portion of the data that had been stored by the primary storage system 220.

During the rehydration procedure executed by the rehydration system 250, the request manager 240 is configured to intercept requests sent by the virtual machine 230 to the primary storage system 220. The request manager 240 is sometimes called a "filter" or a "filter system," because it is configured to process each request sent by the rehydration system 250 to the primary storage system 220.

Because the primary storage system 220 has not yet been fully rehydrated, i.e., the data stored in the primary storage system 220 has not yet been fully recovered, some of the requests sent by the virtual machine 230 to the primary storage system 220 may reference data that is unavailable or incorrect. For example, the virtual machine 230 may submit a read request to read data that has not yet been recovered. As another example, the virtual machine 230 may submit a write request to overwrite data that has not yet been recovered. The request manager 240 is configured to ensure that each request is executed properly.

In particular, the request manager 240 determines whether or not the rehydration system 250 has already recovered the data that is referenced in the request. In this specification, an "extent" is a unit of data that the request manager 240 uses to track the progress of the rehydration of the primary storage system 220. That is, the request manager 240 segments the data stored by the primary storage system 220 for the virtual machine 230 into multiple units called extents and, for each extent, tracks whether or not the rehydration system 250 has rehydrated the extent yet. For example, an extent can be 4 kB, 8 kB, 16 kB, or 32 kB. In some implementations, the rehydration system 250 operates uses the same extent unit as the request manager 240, obtaining data objects from the backup storage system 260 one or more extents at a time. That is, the rehydration system 250 can obtain one or more extents (e.g., multiple adjacent extents) from the backup storage system 260 with each request to the backup storage system 260.

The request manager 240 can use any appropriate data structure to track the status of the extents of the primary storage system 220. For example, the request manager 240 can use a lookup table or a bitmap to track the status of the extents. In particular, each time the rehydration system 250 obtains data from the backup storage system 260 and writes the data to the primary storage system 220, the rehydration system 250 can send a notification to the request manager 240 identifying the data that has been rehydrated. The request manager 240 can then update the status one or more extents corresponding to the rehydrated data, e.g., by changing the bits in the bitmap that represent the corresponding extents from '0' to '1.' In some implementations, the request manager 240 can provide access to the data structure to the rehydration system 250.

If the request manager 240 determines that each extent referenced by the request has already been recovered in the primary storage system 220, then the request manager 240 can forward the request to the primary storage system 220. If the request manager 240 determines that one or more extents referenced by the request have not yet been recovered in the primary storage system 220, then the request manager 240 can execute a procedure for recovering the extents using the rehydration system 250. The procedure executed by the request manager 240 can depend on the type of request—some example procedures are discussed in more detail below.

During online rehydration, the rehydration system 250 can maintain a queue of data object, e.g., extents or groups of extents, that have not yet been rehydrated. The rehydration system 250 can iteratively submit a request for each data object in the queue from the backup storage system 260. In some implementations, the rehydration system 250 can determine the ordering of data object in the queue; in some such implementations, the rehydration system 250 can reorder the data objects in the queue in response to rehydration requests from the request manager 240, as described in more detail below. In some other implementations, the request manager 240 and the rehydration system 250 can collectively determine the ordering of data objects in the queue. For example, the request manager 240 and the rehydration system 250 can have access to different information that is relevant in determining the ordering. As a particular example, the request manager 240 can have access to data identifying extents that have been overwritten and thus does not need to be rehydrated, while the rehydration system 250 can have access to data identifying extents that can be rehydrated relatively quickly because of caching.

In some implementations, as described above, the rehydration system 250 executes a rehydration process to recover all of the data related to the virtual machine 230 that is stored in the primary storage system 220. During the rehydration process, the request manager 240 can work with the rehydration system 250 to prioritize rehydrating data related to requests submitted by the virtual machines 230, as described above. That is, the data related to the request would have been recovered anyway, but the request of the virtual machine 230 prompted the rehydration system 250 to recover that data earlier in the rehydration process than it otherwise would have. This process can be called "active" rehydration, and is completed when all of the data in the primary storage system 220 related to the virtual machine 230 is completely recovered. Active rehydration can be useful when the operations of the virtual machine 230 are to be fully restored, and when the workloads of the virtual machine 230 may run for an extended period of time.

In some other implementations, the rehydration system 250 does not actively recover the data in the primary storage system 220. Instead, the rehydration system 250 only recovers data related to requests submitted by the virtual machine 230. That is, the data related to the requests would not have been recovered (and, in some cases, none of the data stored in the primary storage system 220 would have been recovered) if the virtual machine 230 had not explicitly requested the data. This process can be called "passive" rehydration, where the rehydration system 250 is only activated on-demand, in response to requests from the virtual machine 230. During passive rehydration, some data of the primary storage system 220 may never be retrieved, reducing the time and cost of the rehydration process. Passive rehydration can be useful when the workloads of the virtual machine 230 are going to be short-lived, or when only a relatively small proportion of the primary storage system 220 was lost, e.g., if one or a few files were accidentally deleted. Passive rehydration can also be useful when a developer is running a test using the virtual machine 230; for example, the developer may just want to test the functionality of a single workload of the virtual machine 230 and may not want to saturate the bandwidth of communication link between the rehydration system 250 and the backup storage system 260.

Although a single virtual machine 230 is depicted in FIG. 2A, generally the host node 210 can include multiple different virtual machines 230. In some implementations, instead of or in addition to one or more virtual machines 230, the host node 210 includes one or more containers. Each container can be configured to execute workloads and interact with the other components of the cloud computing platform 200 in a similar way to the virtual machine 230. Generally, in this specification, a "virtual computing instance" refers to any computing resource that can execute workloads in a virtualized computing environment, e.g., virtual machines or containers. Although this specification refers to virtual machines as a particular example of a virtual computing instance, generally any virtual computing resource can be used to implement the techniques described in this specification.

In some implementations in which the host node 210 includes multiple virtual machines and/or containers, the host node 210 includes a single request manager 240 that interacts with each of the virtual machines and/or containers. In some other such implementations, the host node 210 includes multiple different request managers 240; for example the host node 210 can include a respective request manager 240 for each virtual machine and/or each container.

In some implementations, the rehydration system 250 is configured to rehydrate data related to multiple different host nodes 210. For example, the rehydration system 250 may not be a component of the host node 210, and can be configured to interact with the request managers 240 of multiple different host nodes 210.

In some implementations, the request manager 240 and the rehydration system 250 are the same system. That is, a single system can be configured to execute a rehydration procedure for the primary storage system 220, while intercepting requests from the virtual machine 230.

Figure 2B:
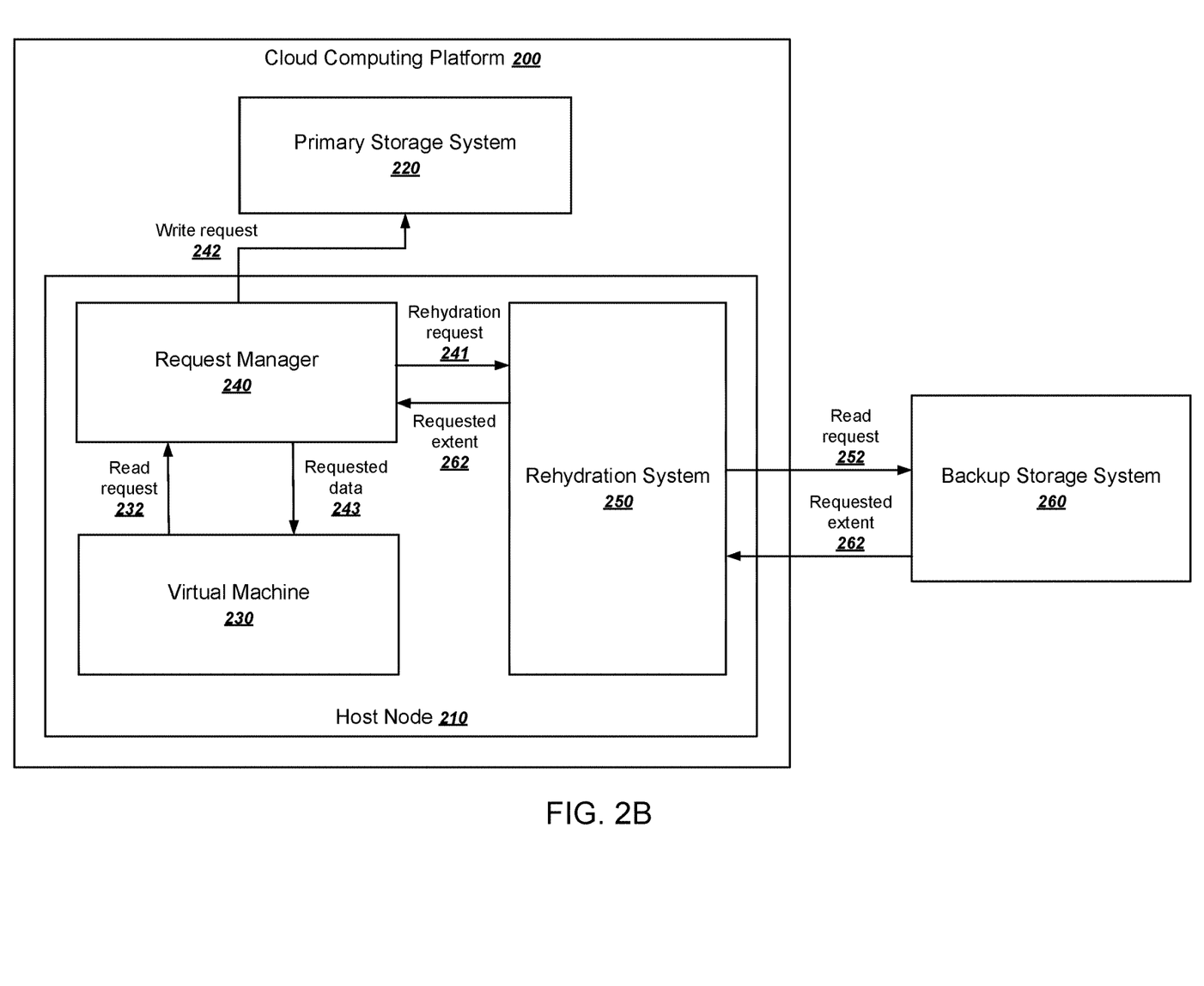
Figure 2C:
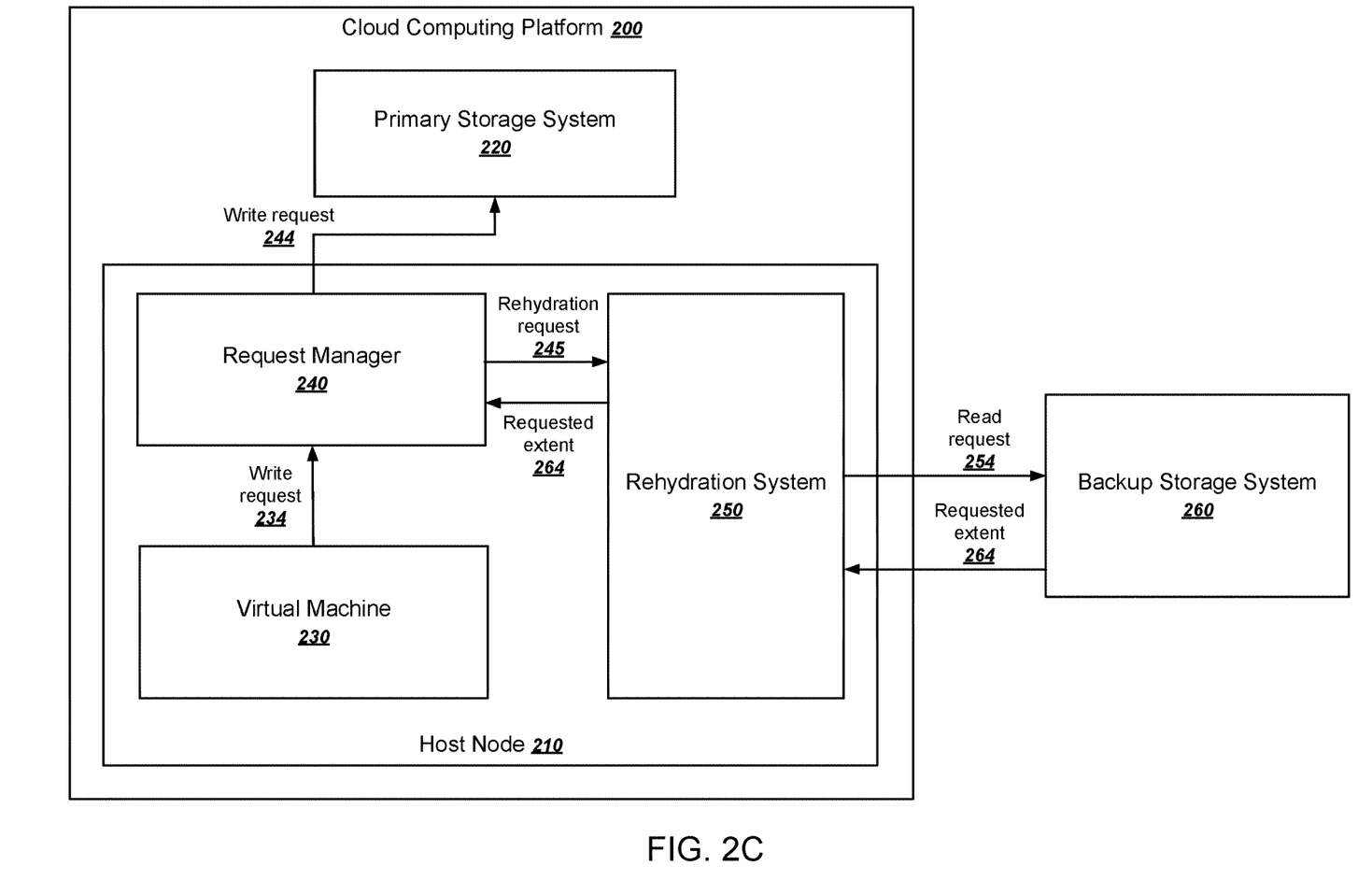

FIGS. 2B and 2C depict the same cloud computing platform 200 as FIG. 2A. As depicted in FIG. 2B, the request manager 240 responds to a read request of the virtual machine 230 that references unrecovered extents. As depicted in FIG. 2C, the request manager 240 responds to a write request of the virtual machine 230 that references unrecovered extents.

Referring to FIG. 2B, the virtual machine 230 submits a read request 232 to the request manager 240 that is a request for data stored in the primary storage system 220. The request manager 240 can determine, for each extent that includes data referenced by the read request 232, whether the extent has already been recovered by the rehydration system 250. In some cases, the rehydration system 250 has recovered an extent during the course of the regular rehydration process. In some other cases, the rehydration system 250 has recovered an extent because the virtual machine 230 submitted a previous request that referenced the extent. That is, if the read request 232 is not the first request submitted by the virtual machine 230 that referenced the extent, the extent can already be available in the primary storage system 220, having been recovered in response to the previous request.

For each extent that includes data referenced by the read request 232, if the extent is already available in the primary storage system 220, then the request manager 240 can forward the read request for the extent to the primary storage system 220. That is, because the extent has already been rehydrated, the extent can be obtained directly from the primary storage system 220. In some implementations, the request manager obtains the available extents from the primary storage system 220 and provides the available extents to the virtual machine 230, e.g., in a single response 243 to the read request 232 that includes extents that were unavailable and obtained using the rehydration system (as described below). In some other implementations, the primary storage system 220 can provide the available extents directly to the virtual machine 230; that is, after the request manager 240 forwards the read request for the available extents to the primary storage system 220, the request manager 240 does not act as an intermediary for providing the available extents from the primary storage system 220 to the virtual machine 230.

If the extent is not available in the primary storage system 220, i.e., if the rehydration system 250 has not already recovered the extent, then the request manager 240 can submit a rehydration request 241 to the rehydration system 250, where the rehydration request 241 is a request for the rehydration system 250 to recover the extent.

In response to the rehydration request 241, the rehydration system 250 can queue a request 252 to the backup storage system 260 to obtain the extent requested by the rehydration request 241. This process is discussed in more detail below with reference to FIG. 3. In some implementations, the rehydration system 250 can put the rehydration request 241 at the front of the queue; that is, the rehydration system 250 can prioritize recovering the requested extent over any other extents in the queue, because the requested extent was explicitly requested by the virtual machine 230.

In the response to the request 252 sent by the rehydration system 250, the backup storage system 260 can provide the requested extent 262 to the rehydration system 250, which in turn can provide the requested extent 262 to the request manager 240. The request manager 240 can then queue a write request 242 to the primary storage system 220 to write the requested extent 262 to the primary storage system 220. Therefore, if the virtual machine 230 submits any subsequent requests that reference the extent 262, the request manager 240 can obtain the extent 262 directly from the primary storage system 220, instead of from the rehydration system 250. In some implementations, the rehydration system 250 submits the write request 242 to the primary storage system 220, instead of the request manager 240. After the write request 242 is executed, the request manager 240 can update the data structure (e.g., the bitmap or lookup table) used to track the status of the extents of the primary storage system 220, to reflect that the requested extent 262 has been recovered.

After obtaining the data 243 requested by the read request 232 (including obtaining any extents that were not yet recovered from the rehydration system 250 and, optionally, obtaining any extents that were already recovered from the primary storage system 220), the request manager 240 can provide the requested data 243 to the virtual machine 230, as a response to the read request 232.

Referring to FIG. 2C, the virtual machine 230 submits a write request 234 to the request manager 240 that is a request for data to be written to the primary storage system 220.

The write request 234 can include data that replaces existing data stored in the primary storage system 220; that is, the write request 234 can overwrite the existing data. However, if the rehydration system 250 has not yet recovered the existing data that is to be overwritten, then the request manager 240 cannot simply overwrite the existing data with the new data, because the rehydration system 250 would subsequently revert back to the existing data when during the rehydration procedure. That is, the backup storage system 260 stores the existing data, before the write request 234, and so when the rehydration system 250 uses the backup storage system 260 to "recover" the data, in fact the rehydration system 250 is erroneously rolling back the write request 234.

Therefore, the request manager 240 can determine, for each extent in the primary storage system 220 that includes data that is overwritten by the write request 234, whether the extent has already been recovered by the rehydration system 250. As described above, each extent might have been recovered during the course of the regular rehydration process, or in response to a previous request submitted by the virtual machine 230 that referenced the extent.

For each extent that includes data that is overwritten by the write request 234, if the extent has already been rehydrated, then the request manager 240 can submit the write request 234 to the primary storage system 220.

If the extent has not already been hydrated, then the request manager 240 can submit a rehydration request 245 to the rehydration system 250, where the rehydration request 245 is a request for the rehydration system 250 to rehydrate the extent.

In response to the rehydration request 245, the rehydration system 250 can queue a request 254 to the backup storage system 260 to obtain the extent requested by the rehydration request 245. This process is discussed in more detail below with reference to FIG. 4. As described above, in some implementations, the rehydration system 250 can put the rehydration request 245 at the front of the queue.

In response to the request 254 provided by the rehydration system 250, the backup storage system 260 can provide the requested extent 264 to the rehydration system 250, which in turn can provide the requested extent 264 to the request manager 240.

In some cases, the write request 234 identifies that the entire requested extent 264 is to be overwritten with new data; i.e., the write request 234 provides a new extent to replace the requested extent 264. In these cases, the request manager 240 can discard the request extent 264 and forward the write request 234 (or another write request 242 generated from the write request 234) to the primary storage system 220.

In some other cases, the write request 234 identifies that only a portion of the requested extent 264 is to be overwritten with new data; i.e., the write request 234 provides data that is smaller than the requested extent 264 to replace a portion of the requested extent 264. In these cases, the request manager 240 can process i) the requested extent 264 and ii) the new data identified in the write request 234 to generate a new extent. The request manager 240 can then submit the new extent in a second write request 244 to the primary storage system 220.

In either case (i.e., whether the request manager 240 modified the requested extent 264 or discarded the requested extent 264), after the write request 244 to the primary storage system 220 is executed, the request manager 240 can update the data structure used to track the status of the extents of the primary storage system 220, to reflect that the requested extent 264 has been recovered. In some implementations, the data structure can further identify whether the extent 264 has been overwritten. For example, for each extent, the data structure can identify one of three options: i) the extent has not yet been recovered, ii) the extent has been recovered, or iii) the extent has been overwritten during the rehydration procedure.

In some implementations, the write request 234 can include entirely new data (i.e., data that does not overwrite existing data in the primary storage system 220) that is to be written to a new location in the primary storage system 220 that is not currently being used, and therefore does not need to be rehydrated by the rehydration system 250. In these cases, the request manager can forward the write request 234 to the primary storage system 220 without interacting with the rehydration system 250.

Figure 3:
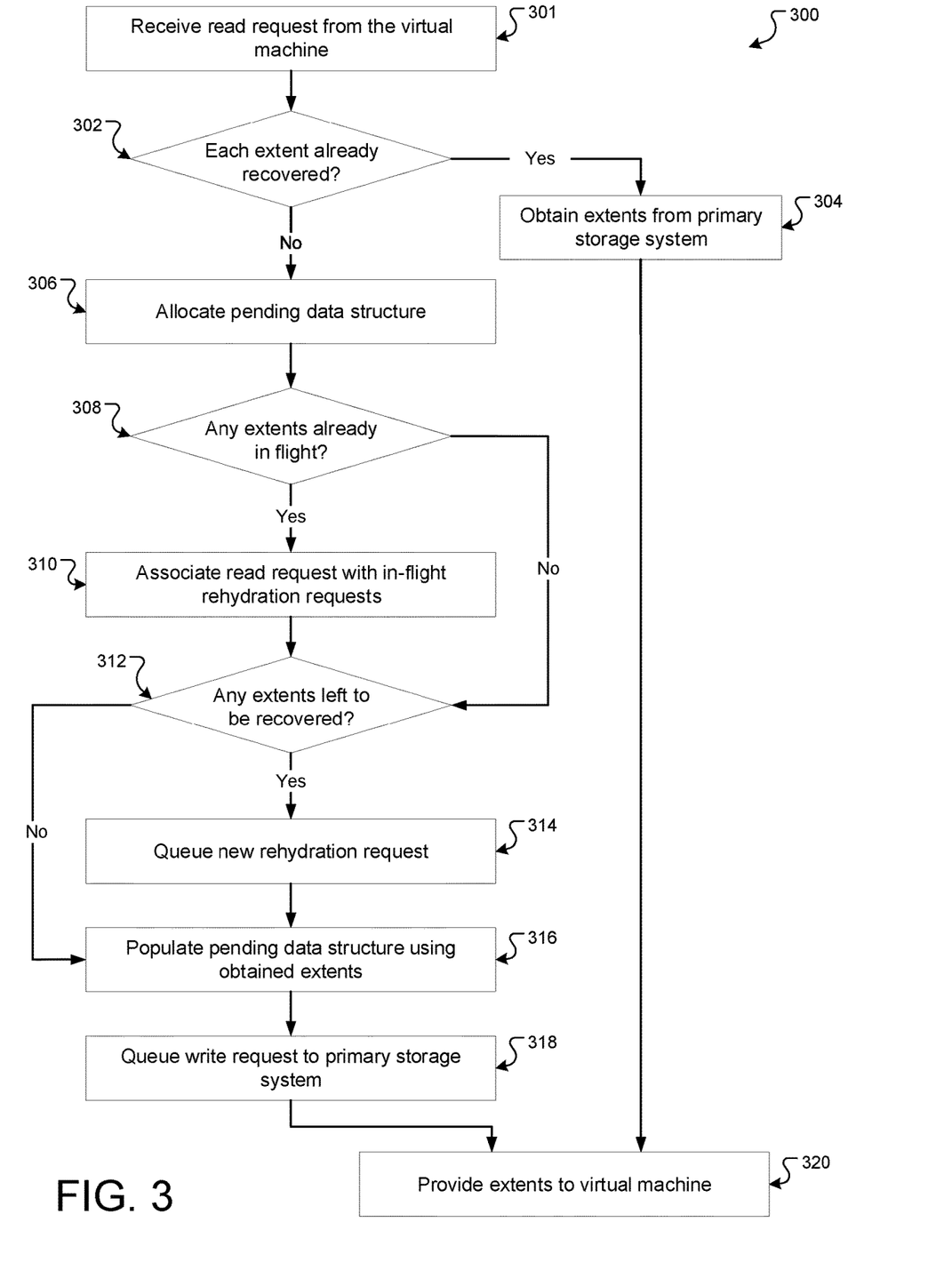
FIG. 3 is a flow diagram of an example process for executing a read request during an online rehydration procedure.
Figure 4:
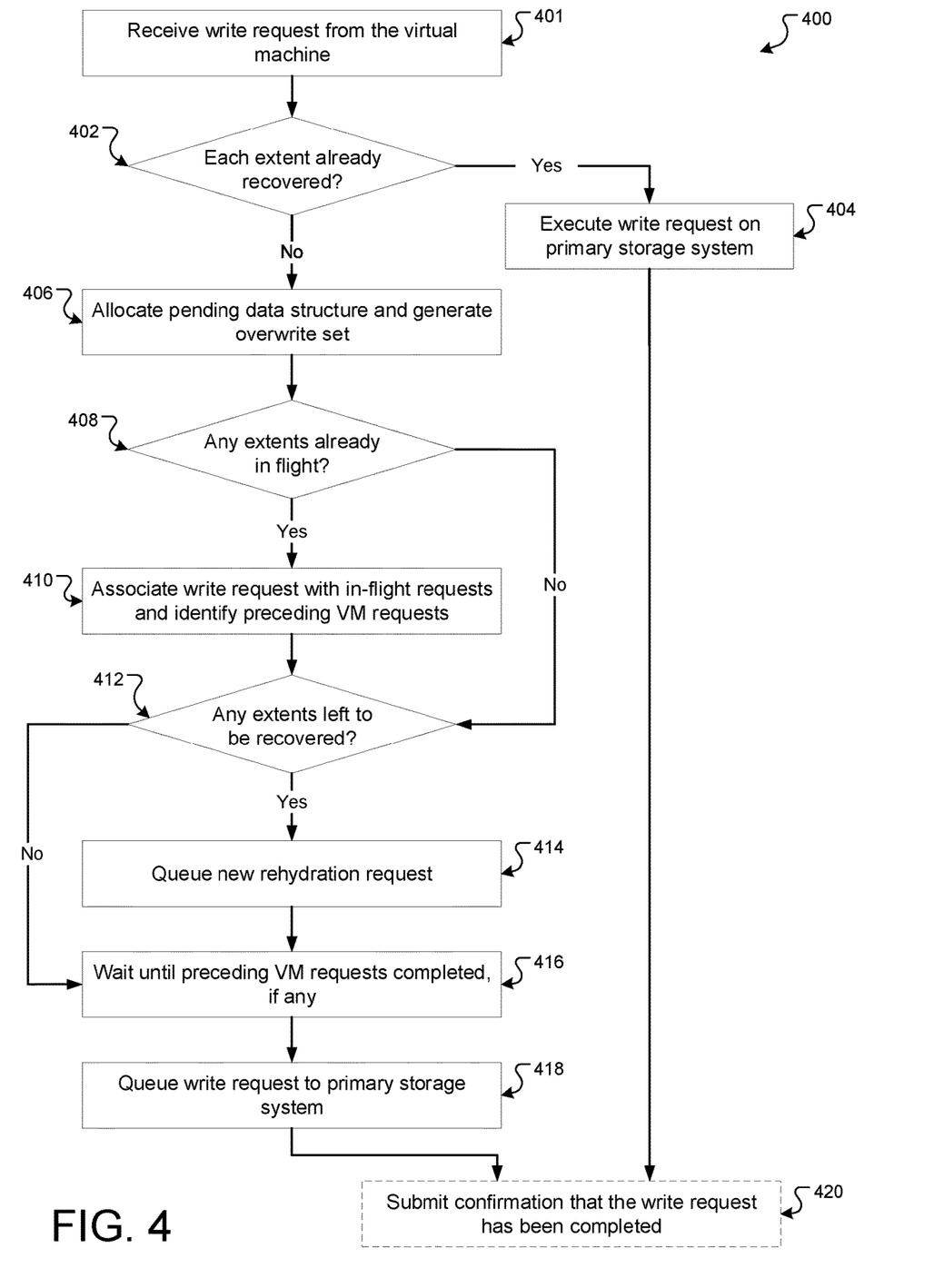
FIG. 4 is a flow diagram of an example process for executing a write request during an online rehydration procedure.

FIG. 3 and FIG. 4 depict example processes for executing read and write requests, respectively, during an online rehydration procedure. While the above description refers to the execution of online rehydration techniques on a cloud computing platform, generally the techniques described in this specification can be performed on any appropriate computer system, e.g., within an on-premises data center.

FIG. 3 is a flow diagram of an example process 300 for executing a read request during an online rehydration procedure. For convenience, the process 300 will be described as being performed by a system of one or more computers located in one or more locations. For example, a request manager, e.g., the request manager 240 depicted in FIG. 2B, appropriately programmed in accordance with this specification, can perform the process 300.

A rehydration system, e.g., the rehydration system 250 depicted in FIG. 2B, can execute the rehydration procedure for a primary storage system, e.g., the primary storage system 220 depicted in FIG. 2B. In some implementations, the rehydration system is a component of the system. The rehydration system can use a backup storage system, e.g., the backup storage system 260 depicted in FIG. 2B, to obtain the data for rehydrating the primary storage system. During the online rehydration procedure, a virtual machine can execute workloads that use the primary storage system and submit the read request to the system.

The system receives the read request from a virtual machine (step 301). The read request is a request to read data from the primary storage system. Each piece of data that is to be read can correspond to one or more respective extents of the primary storage system.

The system determines whether each extent referenced in the read request has already been recovered during previous steps of the rehydration procedure (step 302). For example, the system can maintain a data structure that identifies, for each extent in the primary storage system, whether or not the extent has already been recovered.

If each extent has already been recovered, the system obtains the extents from the primary storage system (step 304).

If one or more extents have not yet been recovered, the system allocates a pending data structure for responding to the read request (step 306). During the process 300, as the system receives different extents referenced in the read request, the system can hydrate the data structure using the different extents, such that at the completion of 300, the data structure includes all the data requested in the read request. In some other implementations, the system can provide individual extents in response to the read request ad hoc, as the extents are obtained.

If a subset of the extents referenced by the read request have been recovered and the remaining extents have not been recovered, then at any point in the process 300 (e.g., before or in parallel with step 306, step 310, step 314, or step 316) the system can submit a read request to the primary storage system to obtain the extents that have already been recovered. That is, the system can obtain the recovered extents from the primary storage system instead of the backup storage system, because generally obtaining data from the primary storage system can be more efficient than obtaining data from the backup storage system (which can, e.g., be a remote storage system).

The system determines whether any of the extents are already "in-flight," i.e., whether the rehydration system is currently in the process of recovering any of the extents (step 308). For example, the system can maintain a data structure, e.g., a list or a tree structure, that tracks all of the in-flight rehydration requests currently being executed by the rehydration system. If none of the extents referenced in the read request are the subject of an in-flight rehydration request, then the system can continue to step 312.

If one or more extents are in-flight, the system associates the read request with the in-flight rehydration requests (step 310). Then, when the in-flight rehydration requests are completed, the system can obtain the extents of the in-flight rehydration requests that were obtained from the backup storage system. That is, the system can wait to complete the process 300 until the in-flight rehydration requests have been executed. In some implementations, the system waits to continue the process 300 until the in-flight rehydration requests have been executed. In some other implementations, the system continues with the process 300 while waiting for the in-flight rehydration requests.

In some implementations, the system can maintain a data structure that tracks other pending requests received from the virtual machine. The system can use this data structure to determine whether any preceding pending requests reference one or more of the same extents that are referenced by the current read request. In some implementations, the system can wait to complete the process 300 until one or more preceding pending requests that reference the same extents are executed. For example, the system can execute the pending request that reference the same extents in the order that the requests were received from the virtual machine.

As a particular example, if a preceding pending request is a write request to overwrite an extent, and the system subsequently receives the current read request, then the system can wait until the preceding write request has been executed (e.g., by the system or a different system) and then obtain the updated extent, i.e., the extent that reflects the overwrite. The system can use the updated extent to respond to the current read request. That is, because the preceding write request was made before the current read request, the system responds to the read request with the data that was most current at the time of the current read request, i.e., the overwritten data provided by the preceding write request. This process is discussed in more detail below with reference to FIG. 4.

The system determines whether there are any extents left to be recovered (step 312). That is, the system determines whether any extents referenced in the read request are neither i) already recovered nor ii) the subject of an in-flight rehydration request. If none of the extents are left to be recovered, then the system can continue to step 316.

If one or more extents are left to be recovered, the system queues a respective rehydration request for each remaining extent (step 314). In some implementations, the new rehydration requests are placed at the front of the queue, i.e., are prioritized by the rehydration system. Then, when the new rehydration requests are completed, the system can obtain the extents of the new rehydration requests that were obtained from the backup storage system. That is, the system can wait to complete the process 300 until the in-flight rehydration requests have been executed. In some implementations, the system waits to continue the process 300 until the in-flight rehydration requests have been executed. In some other implementations, the system continues with the process 300 while waiting for the in-flight rehydration requests.

The system populates the pending data structure using the obtained extents (step 316). That is, the system obtains the extents that have been obtained i) from the primary storage system, ii) from in-flight rehydration requests, and/or iii) from new requests, and uses the obtained extents to hydrate the data structure.

The system queues a write request to the primary storage system (step 318). The write request is a request to write the newly-recovered extents to the storage system. The write request can include extents that were obtained from in-flight rehydration requests and/or new rehydration requests. Therefore, if the newly-recovered extents are referenced by future requests from the virtual machine, the system can obtain the requests directly from the primary storage system. After the write request is executed by the primary storage system, the system can update the data object used to track the status of each extent in the primary storage system to reflect the fact that the extents referenced in the read request have been recovered.

The system provides the extents to the virtual machine in response to the read request (step 320). If only a respective portion of one or more extents was requested, then the system can extract the requested portion and only include the portion in the response to the read request.

FIG. 4 is a flow diagram of an example process 400 for executing a write request during an online rehydration procedure. For convenience, the process 400 will be described as being performed by a system of one or more computers located in one or more locations. For example, a request manager, e.g., the request manager 240 depicted in FIG. 2C, appropriately programmed in accordance with this specification, can perform the process 400.

A rehydration system, e.g., the rehydration system 250 depicted in FIG. 2C, can execute the rehydration procedure for a primary storage system, e.g., the primary storage system 220 depicted in FIG. 2C. In some implementations, the rehydration system is a component of the system. The rehydration system can use a backup storage system, e.g., the backup storage system 260 depicted in FIG. 2C, to obtain the data for rehydrating the primary storage system. During the online rehydration procedure, a virtual machine can execute workloads that use the primary storage system and submit the read request to the system.

The system receives the write request from a virtual machine (step 401). The write request is a request to write data to the primary storage system. The write request can include a request to overwrite existing data that is already stored in the primary storage system. Each piece of data that is to be overwritten can correspond to one or more respective extents of the primary storage system.

The system determines whether each extent referenced in the write request has already been recovered during previous steps of the rehydration procedure (step 402). For example, the system can maintain a data structure that identifies, for each extent in the primary storage system, whether or not the extent has already been recovered. In some implementations, the data structure can further identify whether or not an extent has already been overwritten by preceding write requests.

If each extent has already been recovered, the system executes the write request on the primary storage system (step 404). That is, the system can forward the write request (or a different write request generated from the original write request) to the primary storage system.

If one or more extents have not yet been recovered, the system allocates a pending data structure for executing the write request and generates an overwrite set (step 406). The overwrite set is a set of all extents of the primary storage system that will be overwritten and that have not yet been recovered. During the process 400, as the system obtains different extents in the overwrite set, the system can write to the data structure according to the write request, such that at the completion of 400, the data structure includes all the data that i) is to be overwritten in the storage system and ii) was not already recovered.

If a subset of the extents in the overwrite set have been recovered and the remaining extents have not been recovered, then at any point in the process 400 (e.g., before or in parallel with step 406, step 410, step 414, step 416, or step 418) the system can submit a write request to the primary storage system to overwrite the extents that have been recovered.

The system determines whether any of the extents in the overwrite set are already "in-flight," i.e., whether the rehydration system is currently in the process of recovering any of the extents (step 408). For example, the system can maintain a data structure that tracks all of the in-flight rehydration requests currently being executed by the rehydration system. If none of the extents referenced in the read request are the subject of an in-flight rehydration request, then the system can continue to step 412.

If one or more extents are in-flight, the system associates the write request with the in-flight rehydration requests (step 410). Then, when the in-flight rehydration requests are completed, the system can obtain the extents of the in-flight rehydration requests that were obtained from the backup storage system. That is, the system can wait to complete the process 400 until the in-flight rehydration requests have been executed. In some implementations, the system waits to continue the process 400 until the in-flight rehydration requests have been executed. In some other implementations, the system continues with the process 400 while waiting for the in-flight rehydration requests.

The system can maintain a data structure that tracks other pending requests received from the virtual machine. The system can use this data structure to determine whether any preceding pending requests reference one or more of the same extents that are referenced by the current write request. As a particular example, the virtual machine may have submitted one or more preceding read requests and/or one or more preceding write requests that each reference one or more of the same extents as the current write request. In some implementations, the system can wait to complete the process 400 until one or more preceding pending requests that reference the same extents are executed; this process is discussed below with reference to step 416.

The system determines whether there are any extents in the overwrite set that are left to be recovered (step 412). That is, the system determines whether any extents in the overwrite set are neither i) already recovered nor ii) the subject of an in-flight rehydration request. If none of the extents are left to be recovered, then the system can continue to step 416.

If one or more extents are left to be recovered, the system queues a respective rehydration request for each remaining extent (step 414). In some implementations, the new rehydration requests are placed at the front of the queue, i.e., are prioritized by the rehydration system.

In some implementations, the system can wait to complete the process 400 until the in-flight rehydration requests have been executed. In some such implementations, the system waits to continue the process 400 until the in-flight rehydration requests have been executed.

In some other such implementations, the system continues with the process 400 while waiting for the in-flight rehydration requests.

In some other implementations, the system can complete the process 400, including executing the write request at the primary storage system, before the in-flight rehydration requests have been returned. For example, if the write request submitted by the virtual machine identifies that the entire extent corresponding to an in-flight rehydration request is to be replaced, and the rehydration system has not yet begun writing the extent to the primary storage system (e.g., the rehydration system is waiting for a response from the backup storage system), then the system does not need the in-flight rehydration request to complete in order to overwrite the extent in the primary storage system using the new data. In these implementations, when the in-flight rehydration request does complete (after the completion of the process 400), the system can discard the extent returned by the in-flight rehydration request (which is now stale after the execution of the write request).

The system defers executing the write request until preceding requests submitted by the virtual machine that reference one or more of the same extents are completed (step 416). In some implementations, to maintain correctness, the preceding read requests and/or write requests can be executed (by the system or a different system) in the order in which they were submitted by the virtual machine. For example, the response to each read request can include the data that was most up-to-date at the time that the read request was submitted by the virtual machine; i.e., the response to a particular read request should not include data that was written after virtual machine submitted the read request. Therefore, the system can allow each preceding request submitted by the virtual machine to execute before proceeding to step 418, allowing each preceding read request to reflect the state of the data corresponding to the time at which the read request was submitted.

The system queues a second write request to the primary storage system (step 418).

In some cases, for some extents in the overwrite set, the write request submitted by the virtual machine identifies that the extent is to be entirely overwritten. For example, the write request can include new data that is to wholly replace the extent. In these cases, the system can discard the extent obtained from the backup storage system, and include the new data in the second write request to the primary storage system. Thus, in these cases, of the system queued a new rehydration request instep 414 related to the extent, that new rehydration request was really a "dummy" request queued simply to prevent the rehydration system from subsequently "recovering" the extent and reverting the write request by writing the old data to the primary storage system.

In some cases, for some extents in the overwrite set, the write request submitted by the virtual machine identifies that only a portion of the extent is to be overwritten. For example, the write request can include new data that is smaller than the size of an extent, and identify the portion of the extent that the new data is to replace. In these cases, the system can modify the obtained extent according to the write request submitted by the virtual machine, i.e., overwriting the portion identified by the write request using the new data. The system can then include the modified extent in the second write request to the primary storage.

After the second write request is executed by the primary storage system, the system can update the data object used to track the status of each extent in the primary storage system to reflect the fact that the extents in the overwrite set have been recovered and/or that the extents have been overwritten.

In some implementations, the system submits a confirmation to the virtual machine that the write request has been executed (step 420).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices (also called solid state drives); NVMe devices, persistent memory, magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
a virtual computing instance that is configured to execute one or more workloads;
a primary storage system that is configured to store data for the one or more workloads;
a rehydration system that is configured to rehydrate data in the primary storage system using corresponding data stored in a backup storage system; and
a filter system that is configured to perform operations comprising:
intercepting a request issued by the virtual computing instance to the primary storage system, wherein the request identifies first data stored in the primary storage system;
determining whether the first data has been rehydrated by the rehydration system;
in response to determining that the first data has been entirely rehydrated by the rehydration system, forwarding the request to the primary storage system; and
in response to determining that at least a first portion of the first data has not been rehydrated by the rehydration system:
submitting, to the rehydration system, a rehydration request that identifies the first portion of the first data that has not been rehydrated;
obtaining, from the rehydration system, a response that includes a copy of the first portion of the first data, wherein the rehydration system has obtained the copy from the backup storage system; and
responding to the request using the copy of the first portion of the first data.

Embodiment 2 is the system of embodiment 1, wherein:
the request is a read request that comprises a request to read the first data; and
responding to the request comprises providing the first data to the virtual computing instance in response to the request, the first data including the copy of the first portion.

Embodiment 3 is the system of embodiment 2, wherein the filter system is further configured to perform operations comprising:
determining that a second portion of the first data has been rehydrated by the rehydration system; and
obtaining the second portion of the first data from the primary storage system.

Embodiment 4 is the system of embodiment 1, wherein:
the request is a write request that comprises a request to overwrite the first data; and responding to the request comprises:
overwriting the copy of the first portion of the first data according to the write request; and storing the overwritten copy of the first portion of the first data in the primary storage system.

Embodiment 5 is the system of embodiment 4, wherein:
the write request comprises a request to replace the first portion of the first data with replacement data; and
overwriting the copy of the first portion of the first data and storing the overwritten copy of the first portion of the first data in the primary storage system comprises:
discarding the copy of the first portion of the first data; and
storing the replacement data in the primary storage system in place of the first portion of the first data.

Embodiment 6 is the system of any one of embodiments 4 or 5, wherein:
the write request comprises a request overwrite a strict subset of the first portion of the first data with new data; and
overwriting the copy of the first portion of the first data comprises overwriting, in the copy, the strict subset of the first portion using the new data.

Embodiment 7 is the system of any one of embodiments 4-6, wherein the filter system is further configured to perform operations comprising:
determining that a third portion of the first data has been rehydrated by the rehydration system; and
overwriting the third portion of the first data in the primary storage system according to the write request.

Embodiment 8 is the system of any one of embodiments 1-7, wherein the primary storage system is local to the virtual computing instance and the backup storage system is remote to the virtual computing instance.

Embodiment 9 is the system of any one of embodiments 1-8, wherein the filter system is further configured to perform operations comprising:
in response to determining that a fourth portion of the first data has not been rehydrated by the rehydration system:
determining that the fourth portion of the first data is the subject of an in-flight rehydration request executed by the rehydration system;
obtaining, from the rehydration system after completing the in-flight rehydration request, a copy of the fourth portion of the first data; and
responding to the request using the copy of the fourth portion of the first data.

Embodiment 10 is the system of any one of embodiments 1-9, wherein the filter system is further configured to perform operations comprising:
maintaining first tracking data that identifies, for each extent in the primary storage system related to the virtual computing instance, whether the extent has been rehydrated by the primary storage system; and
in response to obtaining, from the rehydration system, a copy of the first portion of the first data, updating the first tracking data to identify that the first portion of the first data has been rehydrated.

Embodiment 11 is the system of any one of embodiments 1-10, wherein the filter system is further configured to perform operations comprising:
maintaining second tracking data that identifies each pending request received from the virtual computing instance;
determining that one or more preceding pending requests submitted by the virtual computing instance reference at least a fourth portion of the first data; and
deferring completion of the read request until the one or more preceding pending requests have completed.

Embodiment 12 is a method comprising the operations of any one of embodiments 1-11.

Embodiment 13 is a computer storage medium encoded with a computer program, the program comprising instructions that are operable, when executed by data processing apparatus, to cause the data processing apparatus to perform the operations of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes described do not necessarily require the particular order shown, or sequential order, to achieve desirable results. In certain implementations, multitasking and parallel processing can be advantageous.

What is claimed is:

1. A system comprising:
a virtual computing instance that is configured to execute one or more workloads;
a primary storage system that is configured to store data for the one or more workloads;
a rehydration system that is configured to rehydrate data in the primary storage system using corresponding data stored in a backup storage system; and
a filter system that is configured to perform operations comprising:
intercepting a request issued by the virtual computing instance to the primary storage system, wherein the request identifies first data stored in the primary storage system;
determining whether the first data has been rehydrated by the rehydration system;
in response to determining that the first data has been entirely rehydrated by the rehydration system, forwarding the request to the primary storage system; and in response to determining that at least a first portion of the first data has not been rehydrated by the rehydration system:
  determining that the first portion of the first data is subject to an in-flight rehydration request executed by the rehydration system;
  obtaining, from the rehydration system after completing the in-flight rehydration request, a response that includes a copy of the first portion of the first data, wherein the rehydration system has obtained the copy from the backup storage system; and
  responding to the request using the copy of the first portion of the first data.

2. The system of claim 1, wherein:
the request is a read request that comprises a request to read the first data; and
responding to the request comprises providing the first data to the virtual computing instance in response to the request, the first data including the copy of the first portion.

3. The system of claim 2, wherein the filter system is further configured to perform operations comprising:
determining that a second portion of the first data has been rehydrated by the rehydration system; and
obtaining the second portion of the first data from the primary storage system.

4. The system of claim 1, wherein:
the request is a write request that comprises a request to overwrite the first data; and
responding to the request comprises:
  overwriting the copy of the first portion of the first data according to the write request; and
  storing the overwritten copy of the first portion of the first data in the primary storage system.

5. The system of claim 4, wherein:
the write request comprises a request to replace the first portion of the first data with replacement data; and
overwriting the copy of the first portion of the first data and storing the overwritten copy of the first portion of the first data in the primary storage system comprises:
  discarding the copy of the first portion of the first data; and
  storing the replacement data in the primary storage system in place of the first portion of the first data.

6. The system of claim 4, wherein:
the write request comprises a request overwrite a strict subset of the first portion of the first data with new data; and
overwriting the copy of the first portion of the first data comprises overwriting, in the copy, the strict subset of the first portion using the new data.

7. The system of claim 4, wherein the filter system is further configured to perform operations comprising:
determining that a third portion of the first data has been rehydrated by the rehydration system; and
overwriting the third portion of the first data in the primary storage system according to the write request.

8. The system of claim 1, wherein the primary storage system is local to the virtual computing instance and the backup storage system is remote to the virtual computing instance.

9. The system of claim 1, wherein the filter system is further configured to perform operations comprising:
maintaining first tracking data that identifies, for each extent in the primary storage system related to the virtual computing instance, whether the extent has been rehydrated by the primary storage system; and
in response to obtaining, from the rehydration system, a copy of the first portion of the first data, updating the first tracking data to identify that the first portion of the first data has been rehydrated.

10. The system of claim 1, wherein the filter system is further configured to perform operations comprising:
maintaining second tracking data that identifies each pending request received from the virtual computing instance;
determining that one or more preceding pending requests submitted by the virtual computing instance reference at least a fourth portion of the first data; and
deferring completion of the read request until the one or more preceding pending requests have completed.

11. A computer-implemented method comprising:
intercepting a request issued by a virtual computing instance to a primary storage system, wherein the primary storage system is configured to store data for one or more workloads of the virtual computing instance and wherein the request identifies first data stored in the primary storage system;
determining whether the first data has been rehydrated by a rehydration system, wherein the rehydration system is configured to rehydrate data in the primary storage system using corresponding data stored in a backup storage system;
in response to determining that the first data has been entirely rehydrated by the rehydration system, forwarding the request to the primary storage system; and
in response to determining that at least a first portion of the first data has not been rehydrated by the rehydration system:
  determining that the first portion of the first data is subject to an in-flight rehydration request executed by the rehydration system;
  obtaining, from the rehydration system after completing the in-flight rehydration request, a response that includes a copy of the first portion of the first data, wherein the rehydration system has obtained the copy from the backup storage system; and
  responding to the request using the copy of the first portion of the first data.

12. The method of claim 11, wherein:
the request is a read request that comprises a request to read the first data; and
responding to the request comprises providing the first data to the virtual computing instance in response to the request, the first data including the copy of the first portion.

13. The method of claim 12, further comprising:
determining that a second portion of the first data has been rehydrated by the rehydration system; and
obtaining the second portion of the first data from the primary storage system.

14. The method of claim 11, wherein:
the request is a write request that comprises a request to overwrite the first data; and
responding to the request comprises:
  overwriting the copy of the first portion of the first data according to the write request; and
  storing the overwritten copy of the first portion of the first data in the primary storage system.

15. The method of claim 14, wherein:
the write request comprises a request overwrite a strict subset of the first portion of the first data with new data; and
overwriting the copy of the first portion of the first data comprises overwriting, in the copy, the strict subset of the first portion using the new data.

16. The method of claim 14, further comprising:
determining that a third portion of the first data has been rehydrated by the rehydration system; and
overwriting the third portion of the first data in the primary storage system according to the write request.

17. The method of claim 11, further comprising:
maintaining tracking data that identifies each pending request received from the virtual computing instance;
determining that one or more preceding pending requests submitted by the virtual computing instance reference at least a fourth portion of the first data; and
deferring completion of the read request until the one or more preceding pending requests have completed.

18. One or more non-transitory storage media storing instructions that when executed by one or more computers cause the one or more computers to perform operations comprising:
intercepting a request issued by a virtual computing instance to a primary storage system, wherein the primary storage system is configured to store data for one or more workloads of the virtual computing instance and wherein the request identifies first data stored in the primary storage system;
determining whether the first data has been rehydrated by a rehydration system, wherein the rehydration system is configured to rehydrate data in the primary storage system using corresponding data stored in a backup storage system;
in response to determining that the first data has been entirely rehydrated by the rehydration system, forwarding the request to the primary storage system; and
in response to determining that at least a first portion of the first data has not been rehydrated by the rehydration system:
determining that the first portion of the first data is subject to an in-flight rehydration request executed by the rehydration system;
obtaining, from the rehydration system after completing the in-flight rehydration request, a response that includes a copy of the first portion of the first data, wherein the rehydration system has obtained the copy from the backup storage system; and
responding to the request using the copy of the first portion of the first data.

* * * * *